Oct. 27, 1964  W. E. KOCK  3,154,778
METHOD AND APPARATUS FOR OBTAINING DIRECTIONAL LOCATING AND
DETECTING CHARACTERISTICS WITH REDUCED ANTENNA SIZE
Filed July 31, 1959  4 Sheets-Sheet 3

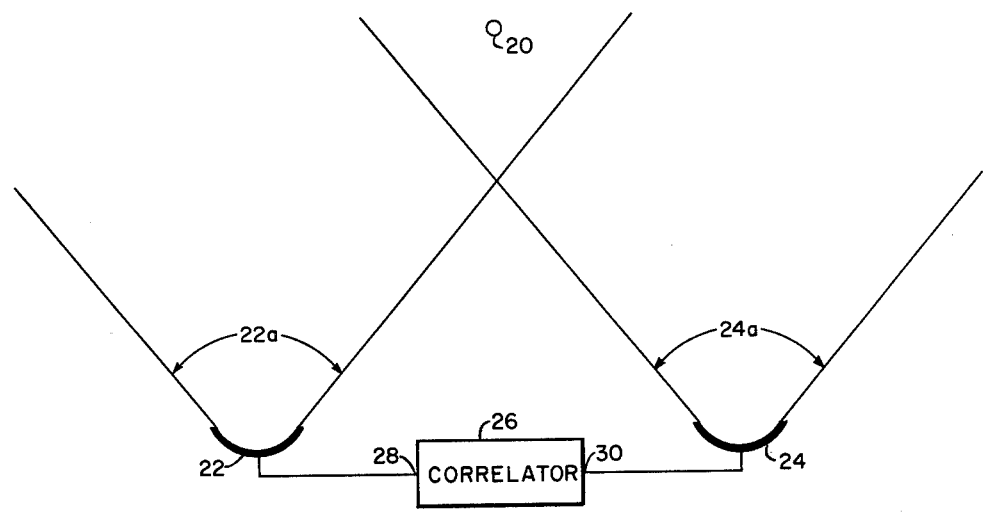
FIG-1
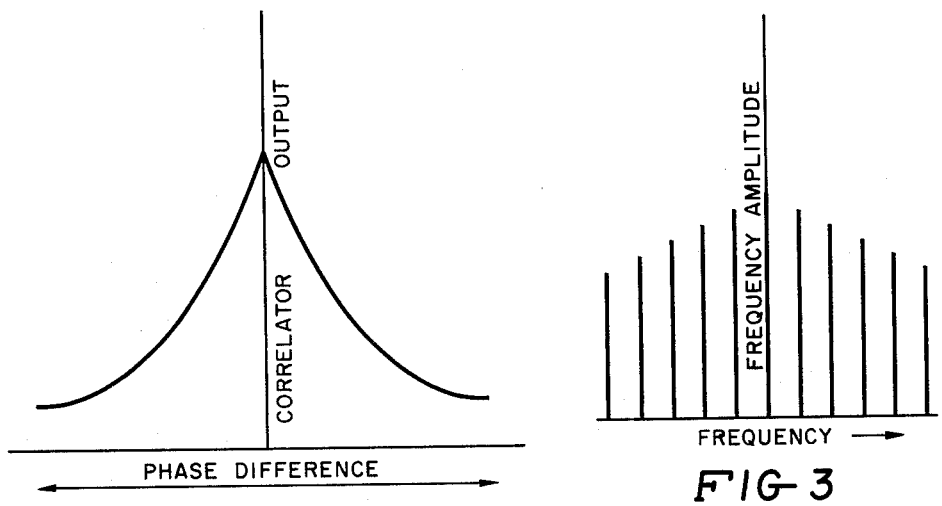
FIG-2
FIG-3
INVENTOR.
WINSTON E. KOCK

INVENTOR.
WINSTON E. KOCK
BY
Richard J. Seeger
ATTORNEY

United States Patent Office 3,154,778
Patented Oct. 27, 1964

3,154,778
METHOD AND APPARATUS FOR OBTAINING DIRECTIONAL LOCATING AND DETECTING CHARACTERISTICS WITH REDUCED ANTENNA SIZE
Winston E. Kock, Ann Arbor, Mich., assignor to The Bendix Corporation, a corporation of Delaware
Filed July 31, 1959, Ser. No. 830,943
26 Claims. (Cl. 343—5)

This invention pertains to a method and apparatus for obtaining directional locating and detecting characteristics with reduced antenna size wherein spaced antenna receivers are employed to receive source signals or reflection signals with the antenna signals being multiplied and integrated over a time period to determine signal coherency and phase likeness in the two antennas.

It is an object of this invention to provide an apparatus usable as a navigational aid wherein a source of known location radiates a multiplicity of discrete frequencies and spaced antennas receive said source radiations with the antennas being connected to the inputs of a correlator wherein the received signals are multiplied and integrated over a predetermined time period to give a maximum output when coherent and in phase signals are received by the correlator.

It is an object to provide in such an apparatus a scan mechanism having a variable phase delay between one of the antennas and the respective correlator input which will act to delay the signal and, therefore, increase the electrical path from said one antenna to the correlator so that coherency and phase likeness will occur when the source is nearer one antenna than the other.

It is a further object to provide an active target detection system wherein the reflections of a transmitted output signal are received by the spaced antennas and fed to a correlator where the signals are multiplied and integrated over a predetermined time period with coherent in phase signals causing a maximum correlator output.

It is a further object to improve beam directivity by transmitting a plurality of discrete frequencies, with the number of frequencies used depending on antenna characteristics and the distance between antennas.

Another object is to further improve beam directivity by providing in such an apparatus means for tapering the amplitudes of the transmitted frequencies.

It is still further object to provide in such an apparatus a variable phase delay between one of the antennas and the correlator to provide a scan search.

A further object is to improve directivity by placing a third antenna adjacent one of the antennas and then comparing the correlator outputs of one pair of antennas against the other.

It is still another object to provide a pair of antennas along a vertical axis which are connected to a correlator and a pair of antennas along a horizontal axis which are connected to a second correlator and a third correlator receiving the chopped outputs of the first two correlators to provide a pencil beam.

It is a further object to provide a forward scatter detecting system wherein the discrete frequency transmitter is spaced from the two receivers with one receiver receiving the signal directly from the transmitter and the other receiver receiving the reflections of a target passing between the transmitter and the other receiver. When the electrical path lengths from the transmitter to the correlator which connects the receivers are equal, then the correlator output will be at a maximum.

It is a further object of this invention to provide a method for obtaining directional locating characteristics using reduced antenna size by radiating a multiplicity of discrete frequencies from the source, receiving these frequencies at spaced points, and multiplying the frequencies and integrating the product of the frequencies over a predetermined time period.

It is a still further object of this invention to provide a method for active detection by radiating from two spaced antennas a multiplicity of discrete frequencies, receiving the reflections at spaced points, multiplying the received signals, and integrating the products of the multiplied signals over a predetermined time period.

These and other objects will become more apparent when preferred embodiments of this invention are described in connection with the drawings, in which:

FIGURE 1 is a schematic diagram of an embodiment of this invention which may be used as a navigational aid;

FIGURE 2 is a graph showing the relation between phase difference of coherent signals plotted along the abscissa, and correlator output, plotted along the ordinate;

FIGURE 3 is a graphical representation of the manner in which the amplitudes (shown along the ordinate) of the transmitted frequencies (shown along the abscissa) are tapered;

Figure 1A:
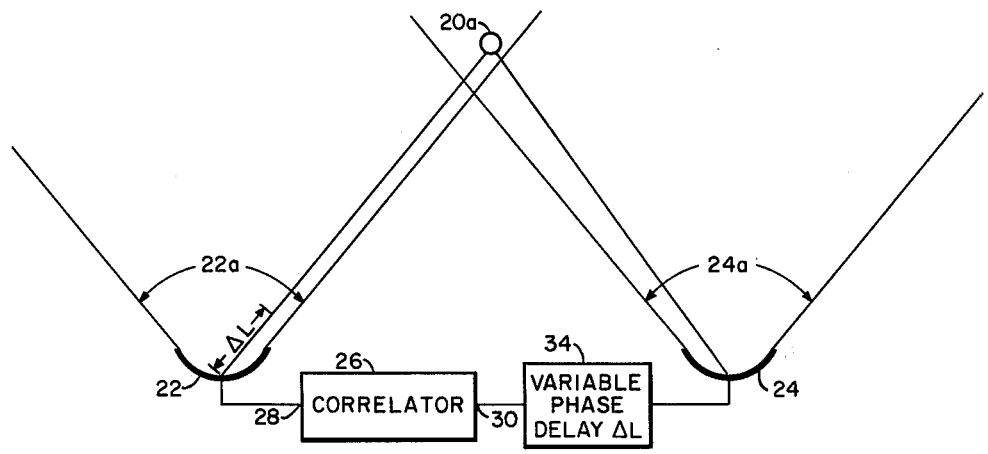
FIGURE 1a is an embodiment similar to that of FIGURE 1 with a variable phase delay added between one antenna and the correlator.

In past systems where highly directional beams were required in navigation, detection, and other systems, large antennas were used since the width of the radiated beam is inversely proportional to the reflector diameter of the antenna. With this invention, instead of a single large antenna, equivalent results are obtained by spacing two smaller antennas a distance apart with greater spacing resulting in greater directivity. These antennas then receive a signal, either directly from a source or reflected from a target, which is composed of a multiplicity of discrete frequencies with the signals from each antenna being multiplied and integrated by a correlator. If coherent signals are in phase, the correlator output is large indicating that the source or the target is in a known direction. The term "coherent" is used to identify those signals which, when in proper phase relationship, will produce a desired output when correlated. Examples include signals of same frequency and signals in harmonic relation.

These considerations will now be taken up in more detail in connection with the drawings. In the schematic diagram of FIGURE 1 a source 20 radiates a plurality of discrete frequencies. This source could be fixed at a ground or water point and serve as a beacon in a navigational system. Receiving the source 20 radiations is an antenna system which may be located on an air, land or water vehicle and comprises a pair of spaced antennas 22, 24 which have beam widths 22a and 24a, respectively. Connected between antennas 22 and 24 is a correlator 26. The function of correlator 26 is to multiply the signals received from antennas 22 and 24 and then integrate the signal products over a predetermined time period. The integral of signals received is at a maximum when the coherent signals are of like phase with the integral diminishing as the frequencies become incoherent and/or out of phase. This is shown in the graph of FIGURE 2 where the ordinate represents the correlator output and the abscissa represents the degree of phase difference between signals of like frequency.

A frequency radiated by source 20 will be received in phase at the inputs of correlator 26 if the source has equal electrical path lengths to the correlator inputs via the antennas. By using a multiplicity of discrete frequencies which may be equally spaced, the system directivity is greatly improved. In this and the following embodiments, the number of frequencies used should be sufficient so that the major lobes formed by the sum of the integrated products of the individual frequencies is kept to one or a usable maximum.

One method of frequency spacing which is very satisfactory is to make the frequencies successive odd multiples of a base frequency. Therefore, once a base frequency has been selected, the frequencies used will be determined by multiplying that base frequency by 1, 3, 5, 7, etc. until the desired number of frequencies has been obtained. Correlator 26 provides an output for each of the like frequencies which are in phase and these outputs are combined to narrow the beam. Too few frequencies will result in a number of major lobes or maximum correlator outputs.

Further increased directivity and reduced side lobes can be obtained by tapering the amplitudes of the frequencies radiated by source 20 as indicated in the graph of FIGURE 3 wherein the ordinate is frequency amplitude and the abscissa indicates the frequency in cycles per second. The frequencies are tapered at the high end and due to antenna imaging, the net effect is a tapering at each end of the transmitted frequencies.

With the type of system shown in FIGURE 1, the directivity available is equal to an antenna having a diameter or length equal to the distance separating antennas 22 and 24. For example, if the antenna spacing is 6500 feet and 20 foot aperture antennas are used, then five frequencies between 50 and 150 megacycles will result in a beam width of 1/10 degree. The antenna spacing and aperture sizes may, of course, be varied as desired to include spacing available on a land, air or water vehicle.

The two antennas 22 and 24 can be turned or rotated until the source 20 is included in the overlapped portions of beams 22a and 24a which will result in a low signal from correlator 26 increasing to a large signal as the source becomes equidistant from the correlator inputs. If it is desired to obtain a sweep or scan without turning the antenna system, then a variable phase change or delay 34 may be connected between antenna 24 and correlator 26 as shown in FIGURE 1a. The phase change in effect changes the electrical path length from the antenna 24 to the corresponding correlator input so that a maximum correlator output signal will occur when the source distances to the antennas are in a ratio corresponding to the particular phase delay setting. By varying the phase delay, the distance ratio is varied and a scanning action results. For example, when the phase of the signal arriving at antenna 24 is delayed by an amount $\Delta L$, then the signal arriving at antenna 22 will be over a longer path by an amount $\Delta L$ compared to the path length to antenna 24 in order for the signals to arrive at correlator 26 in phase and produce a maximum correlator output. Under these circumstances the source 20 would then be at a point 20a which is further from antenna 22 than from antenna 24 by an amount equal to $\Delta L$. By varying the phase delay, the overlapped area of beams 22a and 24a can be scanned to detect source location. In the above example of the 20 foot aperture antennas spaced 6500 feet apart, a scanning angle of about 30° is possible using the variable phase delay. Increasing the antenna beam width will increase the scanned area but will decrease the range of the system. For certain desired results it is, of course, possible to add a variable phase delay between antenna 22 and correlator 26 which could be operated in conjunction with phase delay 34.

Figure 4:
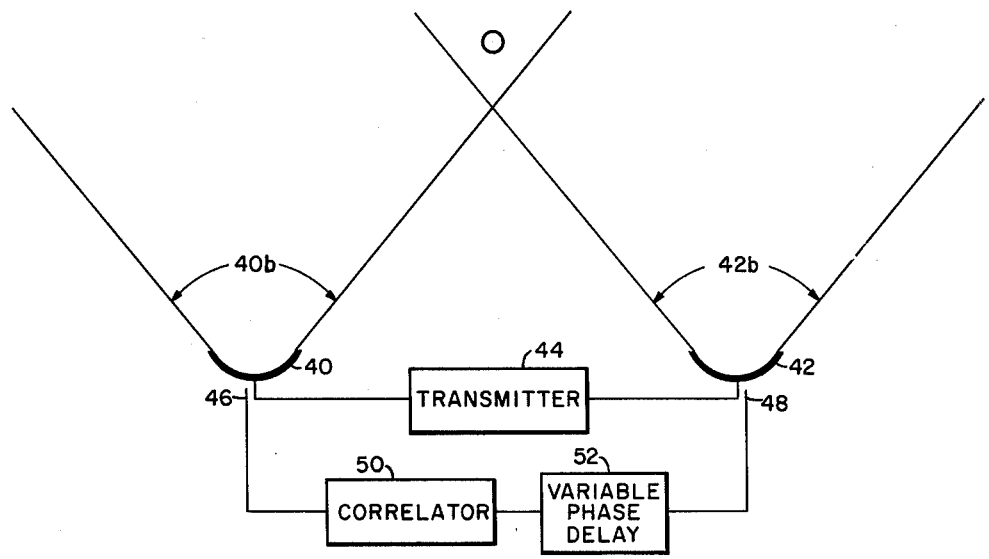
FIGURE 4 is a schematic diagram of a second embodiment of this invention which may be used in an active detection system.

Another important embodiment of this invention is an active detection system which is schematically shown in FIGURE 4. This embodiment is similar to that shown in FIGURE 1a but with the addition of a transmitter which transmits in phase or phase determined signals to spaced antennas where they are radiated to and reflected from a target object to determine its existence and location. In FIGURE 4, spaced antennas 40 and 42, which have beam widths 40b and 42b, respectively, are connected by a transmitter 44 which emits a plurality of discrete frequencies. Also connected to antennas 40, 42 as by directional couplers 46, 48 or other means, is a correlator 50 and a variable phase delay 52. In the operation of this embodiment the transmitted frequencies from transmitter 44 are radiated by each of antennas 40 and 42 with similar frequencies being in phase. A target object in the overlapped portions of beams 40b and 42b will reflect the transmitted signals back to the antennas. The received signals are then fed to correlator 50 where they are multiplied and integrated as described previously to produce an output with a maximum output occurring when the reflected signals are coherent and in phase. Variable phase delay 52 can be employed to obtain a scanning action as described for the embodiment shown in FIGURE 1a. This results in a highly accurate radar detection unit, if electromagnetic waves are used, or a sonar detection unit, if sound waves are used, with minimum antenna size. Not only the direction of, but the distance to the source can be determined by using pulsed signals and measuring their time of return or by having two antenna systems and triangulating.

Figure 4A:
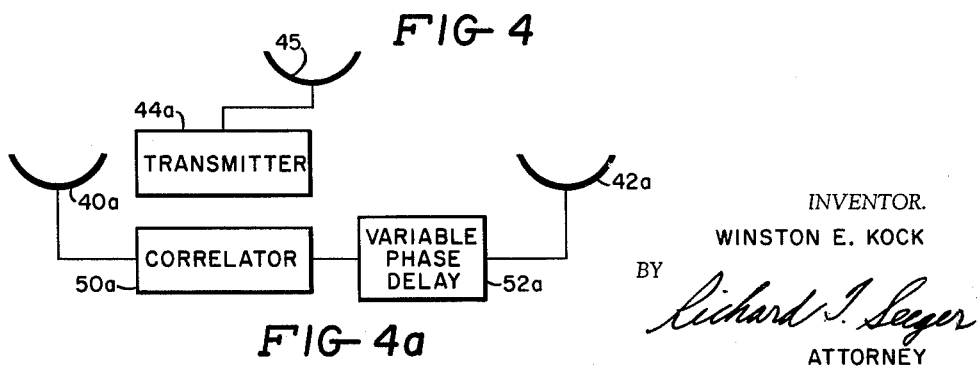
FIGURE 4a is a schematic diagram of an active detection system having a single transmitting antenna.

FIGURE 4a shows a variation of FIGURE 4 wherein a separate transmitting antenna is used. Transmitter 44a sends a plurality of discrete frequencies to antenna 45 which are emitted towards the target. Reflections are received by antennas 40a and 42a and fed to correlator 50a wherein they are multiplied and integrated. A variable phase delay 52a connected between correlator 50a and antenna 42a provides a scanning action.

Figure 5:
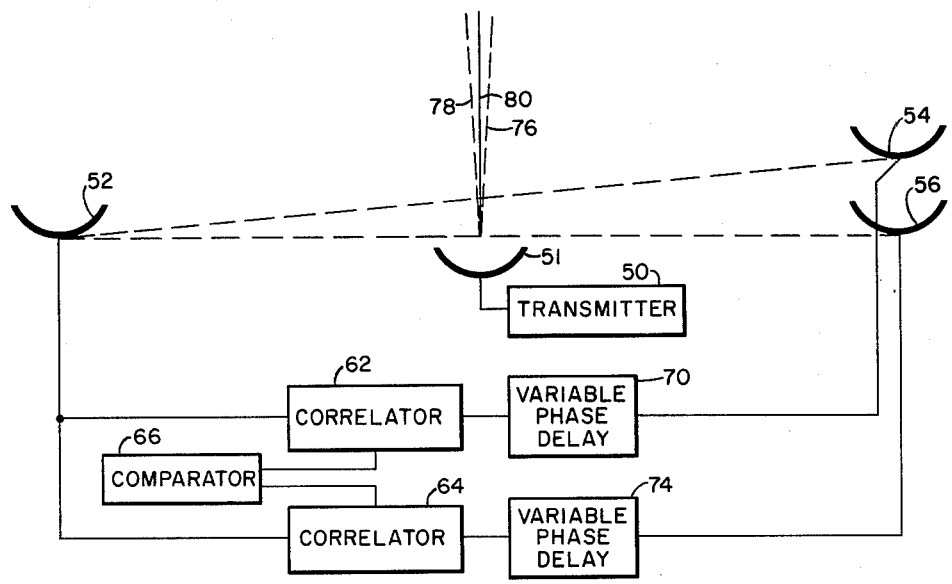
FIGURE 5 is a schematic showing of a further embodiment of this invention incorporating a comparator for two correlator outputs.

In FIGURE 5 is shown a further application of this invention. A transmitter 50 transmits a plurality of discrete frequencies to antenna 51 for radiation. Receiving antenna 52 is connected to correlators 62, 64 and receiving antennas 54, 56 are connected to variable phase delays 70, 74, respectively, which in turn are connected to correlators 62, 64. The outputs of correlators 62, 64 are connected to a comparator 66 which compares the correlator amplitudes. In the operation of this embodiment, antenna 51 transmits a plurality of discrete frequencies. The reflections from any object along a line 76 composed of points having equal electrical paths via the antennas 52, 56 to the correlator 64 inputs, will cause a maximum output in correlator 64. The reflections from any object along line 78 composed of points having equal electrical paths via antennas 52, 54 to the inputs of correlator 62 will cause a maximum output in that correlator. The outputs from correlator 62 and 64 are continuously compared by comparator 66 and when they are equal, the target object is along the bisector 80 of the angle formed by lines 76 and 78. The variable phase delays 70 and 74 may be operated separately to adjust the angle between lines 76 and 78 and may be operated together to provide a scan or sweep motion. Only one correlator would be needed if a switching means were used to continually switch first the outputs of antennas 52, 54 to the correlator and then the outputs of antennas 52 and 56. Also, only two antennas would be needed if the switching means would simultaneously with the switching to the correlator also switch the beam directivity of one of the antennas.

Figure 6:
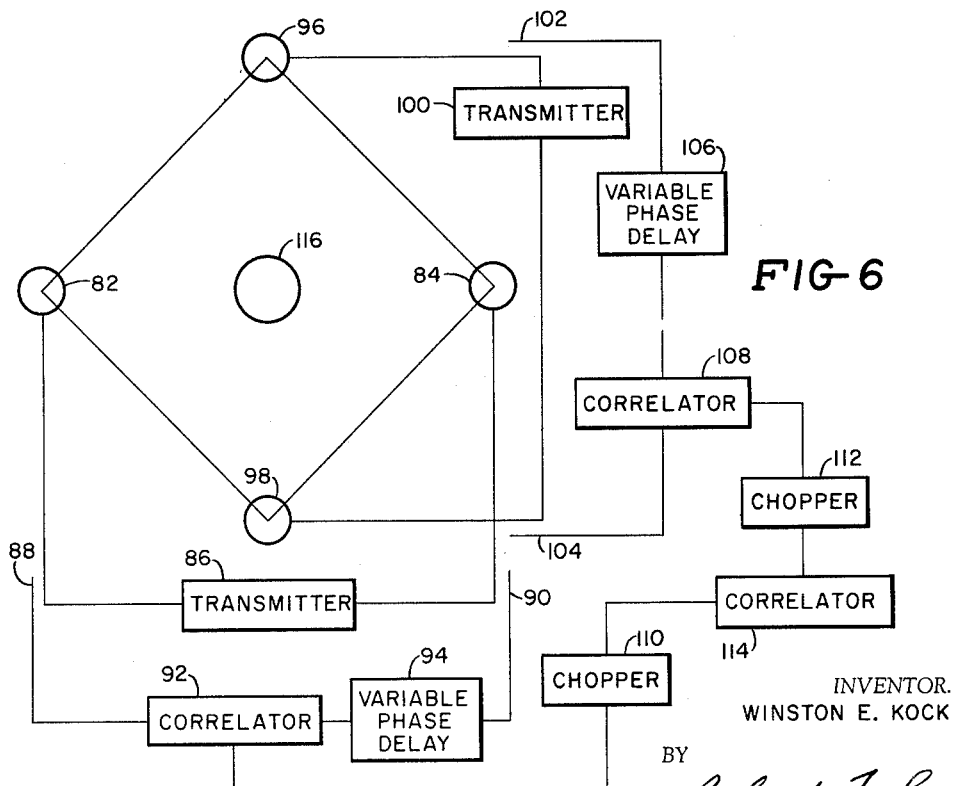
FIGURE 6 is a schematic showing of an embodiment having double correlation for providing a pencil beam.

A pencil beam may be formed by the embodiment shown schematically in FIGURE 6. In this embodiment the antennas act as sending and receiving units but a single sending antenna could be used. Here antennas 82 and 84 are horizontally spaced and have connected therebetween transmitter 86. Directional couplers 88 and 90 connect correlator 92 and variable phase delay 94 to antennas 82 and 84. Antennas 96 and 98 are vertically spaced and have connected therebetween transmitter 100. Directional couplers 102 and 104 connect variable phase delay 106 and correlator 108 to antennas 96 and 98. The outputs of correlators 92 and 108 are connected through choppers 110 and 112, which impart a pulsating characteristic to the correlator outputs, to a third correlator 114. With this system, transmitters 86 and 100 transmit to their respective antennas a multiplicity of discrete frequencies which form a pencil beam 116. Reflections from an object in this beam will be sent to both correlators 92 and 108 which have their outputs chopped and then correlated. Variable phase delays 94 and 106 may be coordinated to provide a desirable scan or sweep pattern to the beam 116. Three antennas equilaterally spaced with a correlator placed between one antenna and each of the other antennas may also be used.

Figure 7:
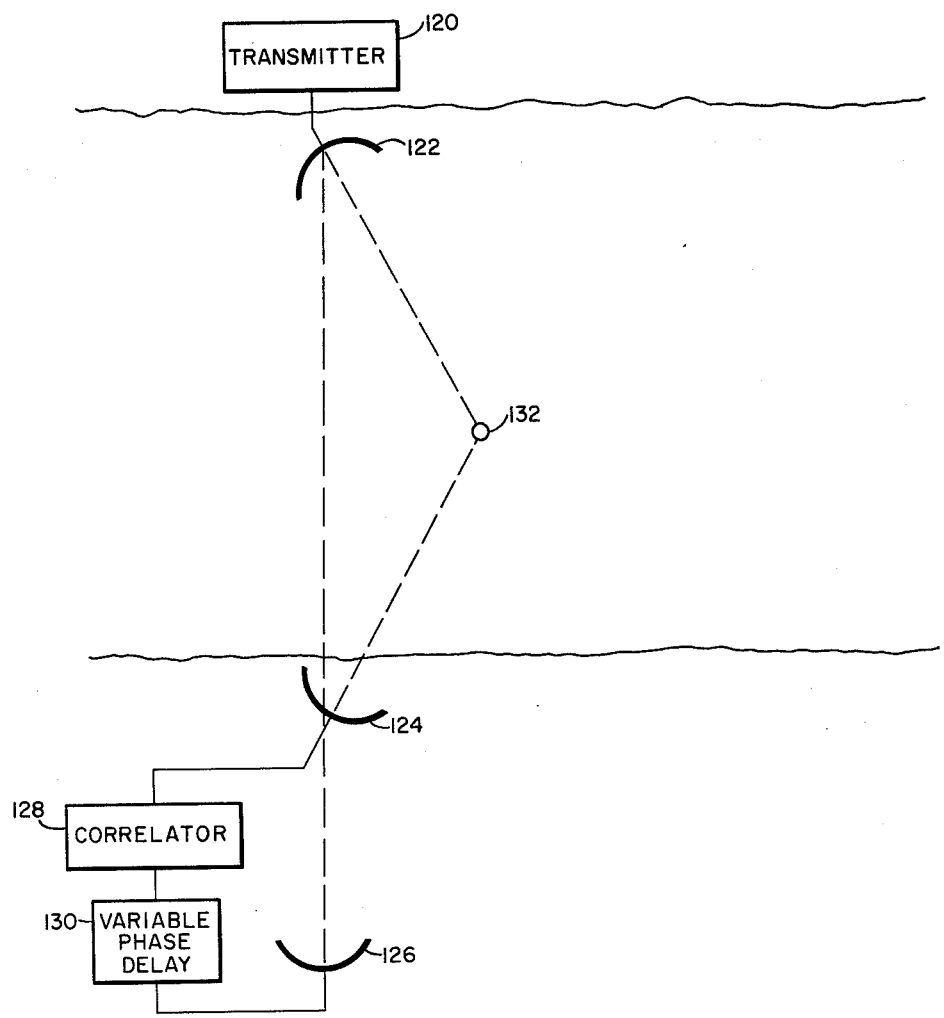
FIGURE 7 is a schematic view of a forward scatter system.

FIGURE 7 is a schematic diagram of a forward scatter system wherein a transmitter 120 is placed on one side of a channel, such as a waterway, and radiates a plurality of discrete frequencies from an antenna 122. A pair of receiving antennas 124, 126 are located on the other side of the channel and joined by a correlator 128 and a variable phase delay 130. When the electrical path from antenna 122 via antenna 126 and phase delay 130 to correlator 128 is equal to the electrical path from antenna 122 via an object 132 and antenna 124 to correlator 128, then the correlator output will be a maximum. Since the forward scatter from object 132 is stronger than a signal reflected back to antenna 122, greater ranges are possible.

Further, the number and placement of radiating means and/or receiving means in an active detection system may be varied to obtain particular results. Also, this invention may be used in missile guidance, launching and navigation.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. Detection apparatus comprising first means for radiating a signal, second means spaced from said first means for radiating a second signal, first receiving means being adjacent said first radiating means for receiving echoes of said first radiating means, second receiving means being adjacent said second radiating means for receiving echoes of said second radiation means signal, correlating means being connected to said first and second receiving means for multiplying the echoes received therefrom and integrating the product over a predetermined time period, and each of said first and second means radiating a multiplicity of discrete frequencies.

2. Detection apparatus comprising first means for radiating a signal, second means spaced from said frst means for radiating a second signal, first receiving means being adjacent said first radiating means for receiving echoes of said first radiating means, second receiving means being adjacent said second radiating means for receiving echoes of said second radiation means signal, correlating means being connected to said first and second receiving means for multiplying the echoes received therefrom and integrating the product over a predetermined time period, each of said first and second means radiating a multiplicity of discrete frequencies which are successive odd multiples of a base frequency.

3. Detection apparatus comprising first means for radiating a signal, second means spaced from said first means for radiating a second signal, first receiving means being adjacent said first radiating means for receiving echoes of said first radiating means, second receiving means being adjacent said second radiating means for receiving echoes of said second radiation means signal, correlating means being connected to said first and second receiving means for multiplying the echoes received therefrom and integrating the product over a predetermined time period, each of said first and second means radiating a multiplicity of discrete frequencies tapered in amplitude.

4. Detection apparatus comprising first means for radiating a signal, second means spaced from said first means for radiating a second signal, first receiving means being adjacent said first radiating means for receiving echoes of said first radiating means, second receiving means being adjacent said second radiating means for receiving echoes of said second radiation means signal, correlating means being connected to said first and second receiving means for multiplying the echoes received therefrom and integrating means for multiplying the echoes received therefrom and integrating the product over a predetermined time period, each of said first and second means radiating a multiplicity of discrete frequencies, and a variable phase delay being between at least one of said receiving means and said correlator with the changing of the phase effecting a beam sweep.

5. Detection apparatus comprising first means for radiating a signal, second means spaced from said first means along a first axis for radiating a second signal, first receiving means being adjacent said first radiating means for receiving echoes of said first radiating means, second receiving means being adjacent said second radiating means for receiving echoes of said second radiation means signal, first correlating means being connected to said first and second receiving means for multiplying the echoes received therefrom and integrating the product over a predetermined time period, third and fourth radiating means being spaced along an axis transverse to said first axis, third and fourth receiving means being adjacent said third and fourth radiating means, respectively, second correlating means connected to said third and fourth receiving means for multiplying the echoes received therefrom and integrating the product over a predetermined period, a third correlator being connected to the outputs of said first and second correlators to multiply and integrate the signals coming therefrom to establish a pencil beam.

6. The apparatus in claim 5 with phase delay means being connected between each of said first and second correlators and their respective receiving means.

7. Detection apparatus comprising first means for radiating a signal, second means spaced from said first means along a first axis for radiating a second signal, first receiving means being adjacent said first radiating means for receiving echoes of said first radiating means, second receiving means being adjacent said second radiating means for receiving echoes of said second radiation means signal, first correlating means being connected to said first and second receiving means for multiplying the echoes received therefrom and integrating the product over a predetermined time period, third and fourth radiating means being spaced along an axis transverse to said first axis, third and fourth receiving means being adjacent, said third and fourth radiating means respectively, second correlating means connected to said third and fourth receiving means for multiplying the echoes received therefrom and integrating the product over a predetermined period, means being connected to the output of each correlator for imparting a pulsating characteristic to the correlator outputs, a third correlator being connected to the output of said last means to multiply and integrate the signals coming therefrom to establish a pencil beam.

8. Detection apparatus comprising radiating means, spaced receiving means for receiving echoes from said radiating means, correlating means being connected to said spaced receiving means for multiplying the echoes received therefrom and integrating the product over a predetermined period, and said radiating means radiating a plurality of discrete frequencies.

9. Detection apparatus comprising radiating means, spaced receiving means for receiving echoes from said radiating means, correlating means being connected to said spaced receiving means for multiplying the echoes received therefrom and integrating the product over a predetermined period where said radiating means radiating a plurality of discrete frequencies which are successive odd multiples of a base frequency.

10. Detection apparatus comprising radiating means, spaced receiving means for receiving echoes from said radiating means, correlating means being connected to said spaced receiving means for multiplying the echoes received therefrom and integrating the product over a predetermined period where said radiating means radiating a plurality of discrete frequencies which are tapered in amplitude.

11. Detection apparatus comprising radiating means, spaced receiving means for receiving echoes from said radiating means, correlating means being connected to said spaced receiving means for multiplying the echoes received therefrom and integrating the product over a predetermined period where said radiating means radiating a plurality of discrete frequencies, a variable phase delay being connected between at least one of said receiving means and said correlator with the changing of the phase effecting a beam sweep.

12. Detection apparatus comprising radiating means, spaced receiving means for receiving echoes from said radiating means, correlating means being connected to said spaced receiving means for multiplying the echoes received therefrom and integrating the product over a predetermined period, said radiating means radiating a plurality of discrete frequencies, one of said receiving means having a multiple directional beam, comparing means to compare correlator outputs of said one receiving means for said multiplicity of directional beams.

13. Detection apparatus comprising radiating means, spaced receiving means for receiving echoes from said radiating means, correlating means being connected to said spaced receiving means for multiplying the echoes received therefrom and integrating the product over a predetermined period, said radiating means radiating a plurality of discrete frequencies, a third receiving means, a second correlator being connected to one of said spaced receiving means and said third receiving means, comparing means for comparing the output amplitudes of said correlators.

14. Directional beam system comprising a beam source, said source emitting a plurality of discrete frequencies which are successive odd multiples of a base frequency, spaced receiving means for receiving at separate spaced points said discrete frequencies, correlating means being connected to said spaced receiving means for multiplying said received frequencies an integrating the product of said frequencies over a predetermined time period.

15. Directional beam system comprising a beam source, said source emitting a plurality of discrete frequencies, spaced receiving means for receiving at separate spaced points said discrete frequencies, correlating means being connected to said spaced receiving means for multiplying said received frequencies and integrating the product of said frequencies over a predetermined time period.

16. Directional beam system comprising a beam source, said source emitting a plurality of discrete frequencies tapered in amplitude, spaced receiving means for receiving at separate spaced points said discrete frequencies, correlating means being connected to said spaced receiving means for multiplying said received frequencies and integrating the product of said frequencies over a predetermined time period.

17. A method of signaling comprising the steps of radiating a plurality of discrete frequencies, receiving these frequencies at spaced points, multiplying these received frequencies, and integrating the products of these frequencies.

18. A method of signaling comprising the steps of radiating a plurality of tapered discrete frequencies, receiving these frequencies at spaced points, multiplying these received frequencies, and integrating the products of these frequencies.

19. A method of signaling comprising the steps of radiating a plurality of tapered discrete frequencies being odd multiples of a base frequency, receiving these frequencies at spaced points, multiplying these received frequencies, and integrating the products of these frequencies.

20. A method of detecting comprising the steps of radiating a plurality of discrete frequencies, receiving the echoes of these frequencies at spaced points, multiplying these received frequencies, and integrating the products of these frequencies.

21. A method of detecting comprising the steps of radiating a plurality of tapered discrete frequencies, receiving the echoes of these frequencies at spaced points, multiplying these received frequencies, and integrating the products of these frequencies.

22. A method of detecting comprising the steps of radiating a plurality of tapered discrete frequencies being odd multiples of a base frequency, receiving the echoes of these frequencies at spaced points, multiplying these received frequencies, and integrating the products of these frequencies.

23. Detection apparatus comprising means for radiating a signal, receiving means for receiving the echoes of said signal comprising at least three receivers triangularly spaced and having overlapping beam patterns, correlating means connecting said receivers so that echoes received from a point located between said receivers will cause a maximum output in each of said receivers, means for imparting a pulsating characteristic to each of the correlator outputs, further correlating means for correlating the pulsating outputs of said previous correlator means.

24. Directional beam system comprising means for radiating a plurality of discrete frequencies, spaced receiving means for receiving at separate spaced points said plurality of discrete frequencies, correlating means being connected to said spaced receiving means for multiplying said received frequencies and integrating the product of said frequencies over a predetermined time period.

25. Directional beam system comprising means for radiating a plurality of discrete frequencies which are successive odd multiples of a base frequency, spaced receiving means for receiving at separate spaced points said plurality of discrete frequencies which are successive odd multiples of a base frequency, correlating means being connected to said spaced receiving means for multiplying said received frequencies and integrating the product of said frequencies over a predetermined time period.

26. Directional beam system comprising means for radiating a plurality of discrete frequencies, spaced receiving means for receiving at separate spaced points said plurality of discrete frequencies, correlating means being connected to said spaced receiving means for multiplying said received frequencies and integrating the product of said frequencies over a predetermined time period, phase delay means being placed between said correlator and at least one of said receiving means.

References Cited in the file of this patent

UNITED STATES PATENTS

| | | |
|---|---|---|
| 2,166,991 | Guanella | July 25, 1939 |
| 2,253,975 | Guanella | Aug. 26, 1941 |
| 2,268,587 | Guanella | Jan. 6, 1942 |
| 2,688,124 | Doty et al. | Aug. 31, 1954 |
| 2,914,762 | Gross et al. | Nov. 24, 1959 |
| 2,962,714 | Meixell et al. | Nov. 29, 1960 |

FOREIGN PATENTS

| | | |
|---|---|---|
| 495,515 | Great Britain | Nov. 15, 1938 |

UNITED STATES PATENT OFFICE
CERTIFICATE OF CORRECTION

Patent No. 3,154,778                      October 27, 1964

Winston E. Kock

It is hereby certified that error appears in the above numbered patent requiring correction and that the said Letters Patent should read as corrected below.

Column 6, lines 39 and 40, strike out "means for multiplying the echoes received therefrom and integrating"; column 8, line 2, for "an" read -- and --.

Signed and sealed this 20th day of April 1965.

(SEAL)
Attest:

ERNEST W. SWIDER                      EDWARD J. BRENNER
Attesting Officer                        Commissioner of Patents